United States Patent [19]

Furlan

[11] Patent Number: 5,349,009
[45] Date of Patent: Sep. 20, 1994

[54] WATER-BASED CONSTRUCTION ADHESIVE MASTIC

[75] Inventor: Wayne R. Furlan, Hellertown, Pa.

[73] Assignee: Air Products and Chemicals, Inc., Allentown, Pa.

[21] Appl. No.: 986,957

[22] Filed: Dec. 8, 1992

[51] Int. Cl.$^5$ ............................................. C08L 31/04
[52] U.S. Cl. .................. 524/563; 524/524; 524/503
[58] Field of Search ............. 524/563, 524, 503

[56] References Cited

FOREIGN PATENT DOCUMENTS 0321868  6/1989  European Pat. Off. .

*Primary Examiner*—Paul R. Michl
*Assistant Examiner*—Edward Cain
*Attorney, Agent, or Firm*—Michael Leach; James C. Simmons; William F. Marsh

[57] ABSTRACT

A water-based construction adhesive composition containing an aqueous emulsion polymer binder which comprises a blend, based on 100 weight parts of polymer solids, of 25 to 75 parts aqueous emulsion vinyl acetate/-ethylene copolymer and 75 to 25 parts aqueous emulsion vinyl acetate homopolymer.

19 Claims, No Drawings

WATER-BASED CONSTRUCTION ADHESIVE MASTIC

FIELD OF THE INVENTION

The present invention relates to construction adhesive mastics, particularly those used on plywood, lumber and drywall.

BACKGROUND OF THE INVENTION

The construction industry is moving towards solvent free construction adhesives to meet volatile organic compound (VOC) regulations currently being enforced in many states, in particular California. Regulations such as Rule 1168 South Coast Air Quality Management will essentially eliminate solvent based adhesives containing 30–40% solvent such as hexane, toluene and acetone. The industry believes that such regulations will be mandated throughout the U.S. and Canada shortly.

In order to meet the various guidelines currently being established by the regulatory organizations, development of a water-based construction adhesive that can meet the VOC requirements while meeting the performance specification of the American Plywood Association (AFG-01) and ASTM C-557 are highly desirable. Solvent based adhesives have in the past set the standards in this area.

Initial attempts at designing a water based adhesive have failed due to performance deficiencies in such areas as strength (moisture resistance) and application characteristics such as "open time".

Some of the difficulties that water based construction adhesives have had in meeting the performance requirements of AFG-01 include the following:

Open time requirements—ranging from 40° F. to 100° F. (5° C. to 38° C.) for 10 minutes.

Freeze-thaw stability—ability to bond to frozen substrates under freezing conditions.

Water-resistance—ability to withstand high humidity in water immersion conditions.

Perhaps the most significant hurdle to overcome in developing a water based construction adhesive is the issue of open time. Typical water based adhesives form a skin when exposed to air, due to the coalescing of the latex particles. At the open time requirements of the industry standard specifications such as 10 minutes at 100° F. (38° C.), water based adhesives form an irreversible skin before the bond is made which causes poor adhesion to the substrate. Solvent based systems do not suffer from this deficiency because, after a skin is formed and a bond is made, the solvents in the adhesive will redisperse the rubber phase and cause wetting of the substrate, thus achieving a durable bond.

SUMMARY OF THE INVENTION

The present invention provides an aqueous adhesive composition comprising an aqueous vinyl acetate-ethylene (VAE) copolymer emulsion and an aqueous vinyl acetate (VAC) homopolymer emulsion.

In a preferred embodiment the adhesive composition is compounded into a high viscosity mastic, especially a mastic of 600,000 to 800,000 cps, which is capable of meeting the performance specifications of AFG-01 and ASTM C-557. The construction adhesive mastic exhibits long open time at 100° F. (38° C.) and also has excellent freeze-thaw stability. The adhesive gives excellent adhesion to plywood, lumber and drywall substrates under dry, wet and freezing application conditions.

Furthermore, the adhesive is capable of meeting the environmental regulations concerning VOC emissions.

DETAILED DESCRIPTION OF THE INVENTION

The present invention is manifested by two embodiments. The first embodiment is the aqueous adhesive emulsion base composition of the polymer binder comprising a blend of 25–75 wt % aqueous VAE copolymer emulsion and 75–25 wt % aqueous VAc homopolymer emulsion, based on emulsion solids (polymer binder), preferably a 50/50 wt % blend. A plasticizer at 5 to 15 parts per hundred parts polymer binder (pphp) is added to the emulsion blend to improve freeze-thaw stability and enhance flexibility.

Suitable VAE copolymer emulsions would comprise 50 to 66% solids with the copolymer consisting essentially of 70 to 85 wt % vinyl acetate and 15 to 30 wt % ethylene, preferably 77 to 81 wt % vinyl acetate and 19 to 23 wt % ethylene. It is preferred that the VAE copolymer emulsion contain polyvinyl alcohol (PVOH) as a stabilizing agent, i.e., part or all of the emulsifying system. It is also preferred that the emulsion be high solids, i.e. 60 to 66 wt % solids, and that the copolymer have a Tg ranging from −10° to 0° C. Methods for making suitable VAE copolymer emulsions are well known in the art. See U.S. Pat. No. 4,921,898 for making the preferred high solids, PVOH/surfactant stabilized VAE emulsion. A high solids, PVOH/surfactant stabilized VAE emulsion is marketed by Air Products and Chemicals, Inc. as Airflex® 465 emulsion.

Suitable VAc homopolymer emulsions contain 50 to 60 wt % solids and preferably are PVOH stabilized with the copolymer having a Tg of 30° to 40° C. Methods for making the homopolymer emulsions are well known in the art and are similar to those used in making the VAE copolymer emulsions except that the polymerization is performed under an inert gas at atmospheric pressure. Useful VAc polymer emulsions include Vinac® XX-210, XX-220 and XX-230 emulsions marketed by Air Products and Chemicals, Inc.

Useful plasticizers would include any of those materials commonly used in the art for VAE and VAc polymer emulsions such as butylbenzyl phthalate, but desirably would be a water soluble plasticizer such as an alkylaryl poly(ethyleneoxy) ethanol containing 2 to 10 ethylene oxide units, preferably having <10 ethylene oxide units and an HLB value of about 14, such as Pycal 94 surfactant sold by ICI Americas.

The second embodiment of the invention is a construction adhesive mastic prepared by compounding the plasticized polymer binder emulsion blend with (a) filler to improve economics, improve rheological properties and increase strength, (b) thixotrope, i.e., a rheology modifier or thickener, especially a polyacrylate thixotrope such as Acrysol TT-615 polyacrylate from Rohm & Haas Co., to increase viscosity and improve sag resistance as well as unexpectedly, in the case of the polyacrylate thixotrope, to act as a humectant to greatly increase the open time of the adhesive, and optionally, but desirably, (c) reinforcing hydrocarbon resin to improve cohesive strength to wood substrates.

The level of water in the overall composition is based on the quantity and type of thickener (thixotrope) and fillers added and is adjusted to allow for the extended open times needed to meet performance requirement of AFG-01 specification, i.e., a total amount of water suitable for meeting AFG-01, for example, 28 to 32 pphp.

In addition, the pigment to binder polymer level is important in achieving the correct balance of strength and open time.

Although any fillet well known to those in the art may be used, it is preferred to use calcium carbonate and clay filler. The calcium carbonate ideally has a particle diameter of about 10 microns and is used at 50 to 135 pphp. The clay is ideally water washed, hydrous clay having an oil absorption of 35–40 and particle diameter of about 0.3 microns. The clay is used in an amount ranging from 0 to 90 pphp.

Suitable reinforcing hydrocarbon resins are present at 15 to 20 pphp and preferably should have a softening point of 90° to 110° C. and be emulsified in water at about 50 wt %.

The polyacrylate thixotrope is used at 10 to 15 pphp and comprises an aqueous polyacrylic emulsion which is alkali swellable. The polyacrylate thixotrope enhances the open time of the mastic composition. Other thixotrope types tested do not give the humectant properties that the polyacrylate afforded but may nevertheless be used. Such thickeners include inverse emulsion. There appears to be a strong interaction of the water content of the emulsion and the thixotrope type that dramatically extended the open time to meet the performance requirements of AFG-01.

Moreover, in order for a construction adhesive to meet the AFG-01 performance requirements, it has to be capable of adhering to frozen lumber under freezing conditions. The present composition is freeze-thaw stable thus allowing the adhesive to be frozen after application for up to 3 weeks and upon thawing will continue to adhere to the substrates until complete bonding strength is achieved.

The components that help to meet this performance requirement include the VAc homopolymer which inherently has good freeze-thaw stability, the water soluble plasticizer which acts as a stabilizer to prevent coagulation of the latex particles and, optionally, the addition of propylene glycol.

The adhesive composition according to the invention meets all the performance requirements of the AFG-01 specification including dry, wet and frozen number, gap fitting requirements and durability (water soak). To meet the less demanding ASTM C-557 drywall specification, the formulation is further compounded with low cost fillers.

In the following tables the amounts of the components are given in parts per hundred parts polymer binder (pphp), i.e., pphp of the VAE and VAc polymer solids. The VAE and VAc polymer binders are given in parts by weight based on polymer solids in the polymer emulsion.

The following Table A provides the preferred and most preferred ranges for an AFG-01 type adhesive.

TABLE A

| COMPONENT | FUNCTION | MOST PREFERRED FORMULATION T | PREFERRED RANGE |
| --- | --- | --- | --- |
| VAE | BINDER | 50 | 25–75 |
| VAc | BINDER | 50 | 75–25 |
| TAMOL 731 | DISPERSING AGENT | 1.0 | 1.0–2.0 |
| NOPCO 8034 | DEFOAMER | 0.75 | 1.0–2.0 |
| HCRE RESIN | REINF. HC RESIN | 18.75 | 15–20 |
| DURAMITE | $CaCO_3$ FILLER | 75 | 50–100 |
| HUBER 95 | CLAY FILLER | 25 | 0–50 |
| WATER* | VOLATILE SOLVENT | 68–70 | 60–70 |
| $NH_4OH$ | pH ADJUSTMENT | ≧8.5 | ≧8.5 |
| PROPYLENE GLYCOL | FREEZE-THAW STABILIZER | 5 | 5–10 |
| PYCAL 94 | ARYL ETHER PLASTICIZER | 10 | 5–15 |
| ACRYSOL TT-615 | THIXOTROPE HUMECTANT | 11.5 | 10–15 |

*Sufficient amount of water in combination with the thixotrope to provide necessary open time.

The following Table B shows the ranges of components for an ASTM C-557 drywall adhesive.

TABLE B

| COMPONENT | FUNCTION | MOST PREFERRED FORMULATION T | PREFERRED RANGE |
| --- | --- | --- | --- |
| VAE | BINDER | 50 | 25–75 |
| VAc | BINDER | 50 | 75–25 |
| TAMOL 731 | DISPERSING AGENT | 2 | 2–3 |
| NOPCO 8034 | DEFOAMER | 0.75 | 1–2 |
| HCRE RESIN | REINF. HC RESIN | 18.75 | 15–20 |
| DURAMITE | $CaCO_3$ FILLER | 110 | 85–135 |
| HUBER 95 | CLAY FILLER | 65 | 40–90 |
| WATER* | VOLATILE SOLVENT | 68–70 | 60–70 |
| $NH_4OH$ | pH ADJUSTMENT | ≧8.5 | ≧8.5 |
| PROPYLENE GLYCOL | FREEZE-THAW STABILIZER | 5 | 5–10 |
| PYCAL 94 | ARYL ETHER PLASTICIZER | 10 | 5–15 |
| ACRYSOL TT-615 | THIXOTROPE HUMECTANT | 11.0 | 10–15 |

*Sufficient amount of water in combination with the thixotrope to provide necessary open time.

In the following experiments, the adhesive compositions were prepared by first preblending the VAE and VAc emulsions. A water soluble plasticizer was then diluted with water to a 50/50 level and added slowly under constant agitation to avoid lumps. To this polymer/plasticizer blend were added the following in order:

1—Dispersing agents and other additives;
2—Fillers—Mixed until smooth and free of lumps;
3—Water—Slowly added until correct solids level is achieved; and
4—Thixotrope added for correct viscosity.

The following test procedures were used:

(a) Tensile/Elongation - Films of adhesive are cast onto release paper at a 50 mil wet film thickness. Films are dried for two weeks at standard conditions. Tensile and elongation specimens were cut using a dumbbell type die. The samples are then further conditioned as follows:

Dry Condition—7 days, 77° F. (25° C.)/50% RH
Wet Condition—7 days, water immersion (tested immediately).

(b) Lap Shear—A 1×4×¼ inch (2.54×10.2×0.64 cm) sanded plywood is bonded at a 1 in² (6.5 cm²) overlap. The adhesive is placed on the plywood and a wire spacer is used to maintain a specified film thickness. Samples are preconditioned for one day at 77° F.(25° C.)/50% RH and then subjected to the following:

Dry Condition—7 days, 100° F. (38° C.)—loose samples are allowed to equilibrate to standard conditions (2–4 hours, before test).

Wet Condition—7 days, 100° F.(38° C.)/95–100% RH—samples are placed in a sealed container with water at the bottom. Samples are placed on a wire rack just above the water so that the humidity saturates the substrates. Samples are tested 2–4 hours after removal from condition.

(c) Open Time—A 100 mil wet adhesive film was cast onto lumber and allowed to condition for 10 minutes at 100° F. (38° C.). A 1×4×¼ inch (2.54×10.2×0.64 cm) piece of plywood also at the same conditions is then placed onto the adhesive with a 500 g weight for 1 minute. The plywood is then removed and the % transfer of adhesive from lumber to the plywood is calculated. A 100% transfer indicates a good wetting of the substrate after the specified drying time. A 0% transfer indicates skin formation and poor wetting of the substrate.

In the following examples the VAE copolymer emulsion was Airflex 465 emulsion which comprises 66 wt % of a PVOH stabilized VAE copolymer that is 79 wt % vinyl acetate and 21 wt % ethylene having a Tg of −5° C. and the VAc polymer emulsion was Vinac XX-210 emulsion which comprises 55 wt % of a PVOH stabilized VAc homopolymer having a Tg of 35° C.

EXAMPLE 1

In Formulations A-C the VAE copolymer and the VAc homopolymer were each tested as the sole polymer binder and as a 50-50 blend in Formulations A—C, respectively. The data in Table 1 shows that the 50-50 blend had significant improvement in the tensile strength and the lap shear strength as compared to either polymer tested alone. This synergism is illustrated by the fact that the elongation properties do not go lower than the VAc homopolymer as the strength properties are enhanced.

TABLE 1

| COMPONENT | FORMULATION A | FORMULATION B | FORMULATION C |
|---|---|---|---|
| VAE | 100 | — | 50 |
| VAc | — | 100 | 50 |
| PHTHALATE PLASTICIZER | 15 | 15 | 15 |
| CACO₃ | 150 | 150 | 150 |
| CLAY | 50 | 50 | 50 |
| WATER | 88.3 | 88.3 | 88.3 |
| DEFOAMER | 0.5 | 0.5 | 0.5 |
| DISPERSING AGENT | 2.0 | 2.0 | 2.0 |
| PROPYLENE GLYCOL | 5 | 5 | 5 |
| NH₄OH | 1.5 | 1.5 | 1.5 |
| THIXOTROPE | 4 | 4 | 4 |
| RESULTS | | | |
| TENSILE (psi/MPa) | 188/1.30 | 464/3.20 | 670/4.62 |
| % ELONGATION | 892 | 304 | 321 |
| LAP SHEAR | | | |
| DRY (psi/MPa) | 331/2.28 | 361/2.49 | 366/2.52 |
| WET (psi/MPa) | 59/0.41 | 89/0.61 | 95/0.66 |

EXAMPLE 2

With Formulation D as the control, Polysat HCRE hydrocarbon resin was added at 37.5 and 75 pphp in Formulations E and F, respectively. It can be seen from the data in Table 2 that the hydrocarbon resin dispersion optimizes the dry and wet lap shear strength properties at the 37.5 pphp level.

TABLE 2

| COMPONENT | FORMULATION D | FORMULATION E | FORMULATION F |
|---|---|---|---|
| VAE | 50 | 50 | 50 |
| VAc | 50 | 50 | 50 |
| PHTHALATE PLASTICIZER | 15 | 15 | 15 |
| CACO₃ | 100 | 100 | 100 |
| CLAY | 100 | 100 | 100 |
| HYDROCARBON RESIN | 0 | 37.5 | 75 |

TABLE 2-continued

| COMPONENT | FORMULATION D | FORMULATION E | FORMULATION F |
|---|---|---|---|
| WATER | 88.3 | 88.3 | 88.3 |
| DISPERSING AGENT | 2 | 2 | 2 |
| PROPYLENE GLYCOL | 5 | 5 | 5 |
| DEFOAMER | 0.5 | 0.5 | 0.5 |
| NH4OH | 0.5 | 0.5 | 0.5 |
| THIXOTROPE | 2.5 | 2.5 | 2.5 |
| RESULTS | | | |
| TENSILE (psi/MPa) | 395/2.72 | 326/2.25 | 174/1.20 |
| % ELONGATION | 58 | 123 | 89 |
| LAP SHEAR | | | |
| DRY (psi/MPa) | 284/1.96 | 323/2.23 | 321/2.21 |
| WET (psi/MPa) | 0/0 | 27/0.19 | 24/0.17 |

EXAMPLE 3

Pycal 94 aryl ether plasticizer was compared to Santicizer 160 phthalate plasticizer in the adhesive mastic compositions. Table 3 shows the incorporation of 15 pphp aryl ether plasticizer versus the phthalate plasticizer greatly enhanced the elongation and the wet shear adhesion without sacrificing the tensile strength.

TABLE 3

| COMPONENT | FORMULATION G | FORMULATION H |
|---|---|---|
| VAE | 50 | 50 |
| VAc | 50 | 50 |
| ARYL ETHER PLASTICIZER | 15 | — |
| PHTHALATE PLASTICIZER | — | 15 |
| CACO3 | 100 | 100 |
| CLAY | 100 | 100 |
| WATER | 88.3 | 88.3 |
| DISPERSING AGENT | 2 | 2 |
| PROPYLENE GLYCOL | 5 | 5 |
| DEFOAMER | 0.5 | 0.5 |
| NH4OH | 1.5 | 1.5 |
| THIXOTROPE | 2.5 | 2.5 |
| RESULTS | | |
| TENSILE (psi/MPa) | 387/2.67 | 395/2.72 |
| % ELONGATION | 152 | 58 |
| LAP SHEAR | | |
| DRY (psi/MPa) | 314/2.17 | 284/1.96 |
| WET (psi/MPa) | 17.5/0.12 | 0/0 |

EXAMPLE 4

The filler to polymer binder level was varied from 200 to 100 pphp. The open time of the adhesive was measured as the % transfer of adhesive onto wood substrate after 10 minutes @ 100° F. (38° C.). As shown by the data in Table 4, the filler level is reduced more thixotrope is needed to maintain the same viscosity, an improvement in the open time of the adhesive is observed.

TABLE 4

| COMPONENT | FORMULATION I | FORMULATION J | FORMULATION K |
|---|---|---|---|
| VAE | 50 | 50 | 50 |
| VAc | 50 | 50 | 50 |
| ARYL ETHER PLASTICIZER | 10 | 10 | 10 |
| CACO3 | 100 | 75 | 50 |
| CLAY | 100 | 75 | 50 |
| HYDROCARBON RESIN | 18.75 | 18.75 | 18.75 |
| WATER | 122.1 | 100.7 | 79.3 |
| DISPERSING AGENT | 2 | 1.5 | 1.0 |
| PROPYLENE GLYCOL | 5 | 5 | 5 |
| DEFOAMER | 0.5 | 0.5 | 0.5 |
| NH4OH (28%) | 1.5 | 1.5 | 1.5 |
| THIXOTROPE | 4.25 | 11 | 11.5 |
| RESULTS | | | |
| % TRANSFER 10 MIN @ 100° F. (39° C.) | 15–20 | 25–30 | 25–30 |
| LAP SHEAR DRY (psi/MPa) | 456/3.14 | 475/3.28 | 496/3.42 |

EXAMPLE 5

As the calcium carbonate/clay ratio is changed from a 50/50 to a 75/25 pphp level in Formulations L and M, respectively, the open time of the adhesive is increased. The $CaCO_3$ has a lower oil-adsorption than the clay filler which does not dry out the adhesive film at the 100° F. (38° C.) open time requirement. See the data in Table 5.

TABLE 5

| COMPONENT | FORMULATION L | FORMULATION M |
|---|---|---|
| VAE | 50 | 50 |
| VAc | 50 | 50 |
| ARYL ETHER PLASTICIZER | 10 | 10 |
| $CACO_3$ | 50 | 75 |
| CLAY | 50 | 25 |
| HYDROCARBON RESIN | 18.75 | 18.75 |
| WATER | 122.1 | 100.7 |
| DISPERSING AGENT | 1.0 | 1.0 |
| PROPYLENE GLYCOL | 5 | 5 |
| DEFOAMER | 0.5 | 0.5 |
| $NH_4OH$ (28%) | 1.5 | 1.5 |
| THIXOTROPE | 4.25 | 4.25 |
| RESULTS | | |
| % TRANSFER 10 MIN @ 100° F. (38° C.) | 20-25 | 35-40 |
| LAP SHEAR - DRY (psi/MPa) | 510/3.52 | 514/3.54 |

EXAMPLE 6

According to the data in Table 6, as the solids level of the adhesive composition is decreased from 70% to 60%, the open time plateaus at 35-40% transfer at about the 65% solids level. Thus, the addition of more water does not offer additional open time benefits.

EXAMPLE 7

The incorporation of Acrysol TT-615 thixotrope (molecular weight ~1 million) at a 60% solids level dramatically increases the % transfer of adhesive from 5% to 85% as can be seen in Table 7. This synergism only occurs with the Acrysol thixotrope at a specific solids level for each formulation to obtain the required open time.

TABLE 6

| COMPONENT | FORMULATION N | FORMULATION O | FORMULATION P |
|---|---|---|---|
| VAE | 50 | 50 | 50 |
| VAc | 50 | 50 | 50 |
| ARYL ETHER PLASTICIZER | 10 | 10 | 10 |
| $CACO_3$ | 75 | 75 | 75 |
| CLAY | 25 | 25 | 25 |
| HYDROCARBON RESIN | 18.75 | 18.75 | 18.75 |
| WATER | 57.5 | 79.3 | 104.4 |
| DISPERSING AGENT | 1.0 | 1.0 | 1.0 |
| PROPYLENE GLYCOL | 5 | 5 | 5 |
| DEFOAMER | 0.75 | 0.75 | 0.75 |
| $NH_4OH$ (28%) | 1.5 | 1.5 | 1.5 |
| THIXOTROPE INVERSE-EMULSION | 2.5 | 3.0 | 3.5 |
| RESULTS | | | |
| % TRANSFER 10 MIN @ 100° F. (38° C.) | 0-5 | 35-40 | 35-40 |
| LAP SHEAR DRY (psi/MPa) | 511/3.52 | 500/3.45 | 511/3.52 |

TABLE 7

| COMPONENT | FORMULATION Q | FORMULATION R | FORMULATION S | FORMULATION T |
|---|---|---|---|---|
| VAE | 50 | 50 | 50 | 50 |
| VAc | 50 | 50 | 50 | 50 |
| ARYL ETHER PLASTICIZER | 10 | 10 | 10 | 10 |
| $CACO_3$ | 75 | 75 | 75 | 75 |
| CLAY | 25 | 25 | 25 | 25 |
| HYDROCARBON RESIN | 18.75 | 18.75 | 18.75 | 18.75 |
| WATER | 61 | 106.9 | 61 | 106.9 |
| DISPERSING AGENT | 1.0 | 1.0 | 1.0 | 1.0 |
| PROPYLENE GLYCOL | 5 | 5 | 5 | 5 |
| DEFOAMER | 0.75 | 0.75 | 0.75 | 0.75 |
| $NH_4OH$ (28%) | 1.5 | 1.5 | 1.5 | 1.5 |
| INVERSE EMULSION THIXOTROPE | 2.5 | 3.5 | — | — |
| ACRYSOL THIXOTROPE | — | — | 11.5 | 11.5 |
| RESULTS | | | | |
| % TRANSFER 10 MIN @ 100° F. (38° C.) | 4.7 | 35 | 2.5 | 82.9 |
| LAP SHEAR | 511/3.52 | 511/3.52 | 472/3.26 | 498/3.43 |

TABLE 7-continued

| COMPONENT | FORMULATION Q | FORMULATION R | FORMULATION S | FORMULATION T |
|---|---|---|---|---|
| DRY (psi/MPa) | | | | |

EXAMPLE 8

Formulation T of Example 7 was tested for certification compliance to AFG-01 performance specifications. The data of Table 8 shows that Formulation T exceeded the minimum required performance.

TABLE 8

| AFT-01 TEST | RESULTS AVG. (LB)/(KG) | MINIMUM REQ. |
|---|---|---|
| WET LUMBER | 808/366.5 | 225/102.1 |
| FROZEN LUMBER | 259/117.5 | 150/68 |
| DRY LUMBER | 405/183.7 | 225/102.1 |
| MOISTURE RESISTANCE | 355/161 | 225/102.1 |
| OXIDATION RESISTANCE | PASS | PASS 180 DEGREE MANDREL BEND |

EXAMPLE 9

Table 9 shows the ASTM C 557 testing that was conducted on Formulation U of Table B. This formula has a higher pigment to binder ratio to improve economics for the less demanding ASTM C 557 specification.

TABLE 9

| ASTM C-557 TEST | RESULTS | REQUIREMENTS |
|---|---|---|
| OPEN TIME | 100% TRANSFER | 75% TRANSFER 30 MIN @ 77° F. (25° C.) |
| WETTING CHARACTERISTICS | PASS | WET PLYWOOD |
| SHEAR STRENGTH (psi/MPa) | | |
| 24 HOUR | 66.7/0.46 | 10/0.07 |
| 14 DAY | 87.0/0.60 | 40/0.28 |
| SHEAR STRENGTH (psi/MPa) CYCLIC EXPOSURE STATIC LOAD IN SHEAR 24 HOURS | 70/0.48 | 80% OF SHEAR VALUE |
| 73° F./40 LB (23° C./18.1 KG) | PASS | PASS |
| 100° F./20 LB (38° C./91. KG) | PASS | PASS |
| TENSILE STRENGTH (psi/MPa) | | |
| 24 HOUR | 23.9/0.16 | 15/0.10 |
| 14 DAY | 31.4/0.22 | 25/0.17 |
| BRIDGING CHARACTERISTICS | PASS | MAINTAIN BRIDGE BETWEEN FRAMING AND WALLBOARD |
| AGING PROPERTIES | PASS | NO EMBRITTLEMENT AFTER 500 HR 158° F. (70° C.) |
| FREEZE THAW STABILITY 0° C. | PASS | NO BLISTERING OR DISCOLORATION |
| VINYL COVERED GYPSUM COMPATIBILITY | PASS | NO BLISTERING OR DISCOLORATION |
| ADHESIVE STAINING VINYL CONVERED LAMINATE | PASS | NO DISCOLORATION OR SWELLING |

STATEMENT OF INDUSTRIAL APPLICATION

The adhesive compositions of the present invention can be used as AFG-01 subfloor adhesive or ASTM C-557-73 adhesive for fastening gypsum billboard to wood framing.

I claim:

1. In a water based construction adhesive mastic composition comprising polymer binder, plasticizer, filler and thixotrope in an aqueous medium, the improvement which comprises as the polymer binder 25 to 75 wt % (polymer solids) of an aqueous vinyl acetate/ethylene copolymer emulsion and 75 to 25 wt % (polymer solids) of an aqueous vinyl acetate homopolymer emulsion, based on 100 parts by weight polymer binder.

2. The composition of claim 1 in which the vinyl acetate/ethylene copolymer emulsion is 50 to 66 wt % solids, the copolymer consisting essentially of 70-85 wt % vinyl acetate and 15-30 wt % ethylene.

3. The composition of claim 2 in which the copolymer emulsion is polyvinyl alcohol stabilized.

4. The composition of claim 3 in which the copolymer emulsion is 60-66 wt % solids and the copolymer has a Tg of −10° to 0° C.

5. The composition of claim 1 in which the vinyl acetate homopolymer emulsion is 50-60 wt % solids and the homopolymer has a Tg of 30°-40° C.

6. The composition of claim 5 in which the homopolymer emulsion is polyvinyl alcohol stabilized.

7. The composition of claim 1 in which
   (a) the vinyl acetate/ethylene copolymer emulsion is 60-66 wt % solids and polyvinyl alcohol stabilized, the copolymer consisting essentially of 70–85 wt % vinyl acetate and 15–30 wt % ethylene, and (b) the vinyl acetate homopolymer emulsion is 50–60 wt % solids and polyvinyl alcohol stabilized, the homopolymer having a Tg of 30°–40° C.

8. The composition of claim 1 which comprises per one hundred parts of polymer binder
   (a) 50–100 parts calcium carbonate filler,
   b) 0–50 parts clay filler,
   (c) 5–15 parts water soluble alkylaryl poly(ethyleneoxy) ethanol plasticizer,
   (d) 10–15 parts polyacrylate thixotrope, and
   (e) 15–20 parts reinforcing hydrocarbon resin.

9. The composition of claim 1 which comprises per one hundred parts of polymer binder
   (a) 85–135 parts calcium carbonate filler,
   (b) 40–90 parts clay filler,
   (c) 5–15 parts water soluble alkylaryl poly(ethyleneoxy) ethanol plasticizer,
   (d) 10–15 parts polyacrylate thixotrope, and
   (e) 15–20 parts reinforcing hydrocarbon resin.

10. The composition of claim 1 in which the polymer binder is about 50 wt % vinyl acetate/ethylene copolymer emulsion and about 50 wt % vinyl acetate homopolymer emulsion.

11. The composition of claim 7 in which the polymer binder is about 50 wt % vinyl acetate/ethylene copolymer emulsion and about 50 wt % vinyl acetate homopolymer emulsion.

12. The composition of claim 11 which comprises per one hundred parts of polymer binder
    (a) 50–100 parts calcium carbonate filler,
    (b) 0–50 parts clay filler,
    (c) 5–15 parts water soluble alkylaryl poly(ethyleneoxy) ethanol plasticizer,
    (d) 10–15 parts polyacrylate thixotrope, and
    (e) 15–20 parts reinforcing hydrocarbon resin.

13. The composition of claim 11 which comprises per one hundred parts of polymer binder
    (a) 85–135 parts calcium carbonate filler,
    (b) 40–90 parts clay filler,
    (c) 5–15 parts water soluble alkylaryl poly(ethyleneoxy) ethanol plasticizer,
    (d) 10–15 parts polyacrylate thixotrope, and
    (e) 15–20 parts reinforcing hydrocarbon resin.

14. The composition of claim 11 which comprises per one hundred parts of polymer binder
    (a) 75 parts calcium carbonate filler,
    (b) 25 parts clay filler,
    (c) 10 parts water soluble alkylaryl poly(ethyleneoxy) ethanol plasticizer,
    (d) 11.5 parts polyacrylate thixotrope, and
    (e) 18.75 parts reinforcing hydrocarbon resin.

15. The composition of claim 11 which comprises per one hundred parts of polymer binder
    (a) 110 parts calcium carbonate filler,
    (b) 65 parts clay filler,
    (c) 10 parts water soluble alkylaryl poly(ethyleneoxy) ethanol plasticizer,
    (d) 11 parts polyacrylate thixotrope, and
    (e) 18.75 parts reinforcing hydrocarbon resin.

16. An aqueous adhesive composition comprising a blend of 25–75 wt % aqueous vinyl acetate/ethylene copolymer emulsion and 75–25 wt % vinyl acetate homopolymer emulsion, wt % based on polymer solids, and a plasticizer at 5–15 parts per 100 parts polymer solids.

17. The composition of claim 16 in which the plasticizer is a water soluble alkylaryl poly(ethyleneoxy) ethanol.

18. The composition of claim 16 in which
    (a) the vinyl acetate/ethylene copolymer emulsion is 60–66 wt % solids and polyvinyl alcohol stabilized, the copolymer consisting essentially of 70–85 wt % vinyl acetate and 15–30 wt % ethylene, and
    (b) the vinyl acetate homopolymer emulsion is 50–60 wt % solids and polyvinyl alcohol stabilized, the homopolymer having a Tg of 30°–40° C.

19. The composition of claim 18 in which the plasticizer is a water soluble alkylaryl poly(ethyleneoxy) ethanol.

* * * * *